INVENTOR
GEORGE KENDEL

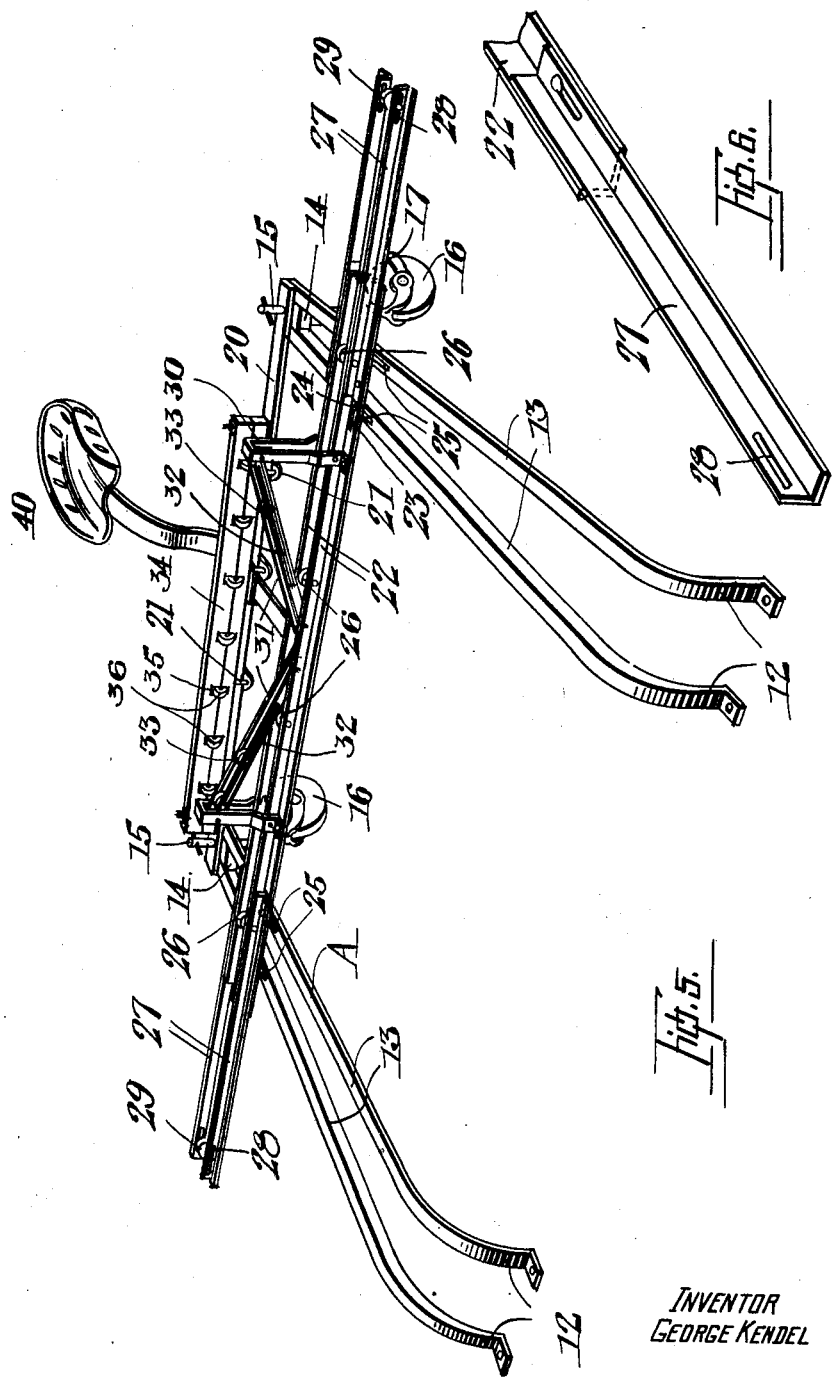

UNITED STATES PATENT OFFICE.

GEORGE KENDEL, OF McNUTT, SASKATCHEWAN, CANADA.

DRAG-HARROW CLEANER.

1,383,403.      Specification of Letters Patent.      Patented July 5, 1921.

Application filed April 19, 1920. Serial No. 375,031.

*To all whom it may concern:*

Be it known that I, GEORGE KENDEL, a subject of the King of Great Britain, a resident of the village of McNutt, Province of Saskatchewan, Dominion of Canada, have invented certain new and useful Improvements in Drag-Harrow Cleaners, of which the following is a specification.

This invention relates to improvements in drag harrow cleaners, and the objects of the invention are to facilitate cleaning the harrow teeth from weeds, straw and the like, thereby permitting the harrow to perform better work, to provide means whereby the harrows may be vertically displaced to allow the foreign material such as weeds, and straw collected thereby to be deposited in heaps by gravity, to permit of the desired number of harrow sections being utilized and each section individually cleaned, and generally to adapt the harrow to better perform the functions required of it.

With the above and other objects in view, the invention consists essentially of the improved construction particularly described and set forth in the following specification and accompanying drawings forming part of the same.

In the drawings:

Fig. 5 is a perspective view of a portion of the truck frame.

Fig. 6 is a perspective view of one of the extension bars of the truck frame.

Like characters of reference refer to like parts in the several figures.

Figure 1:
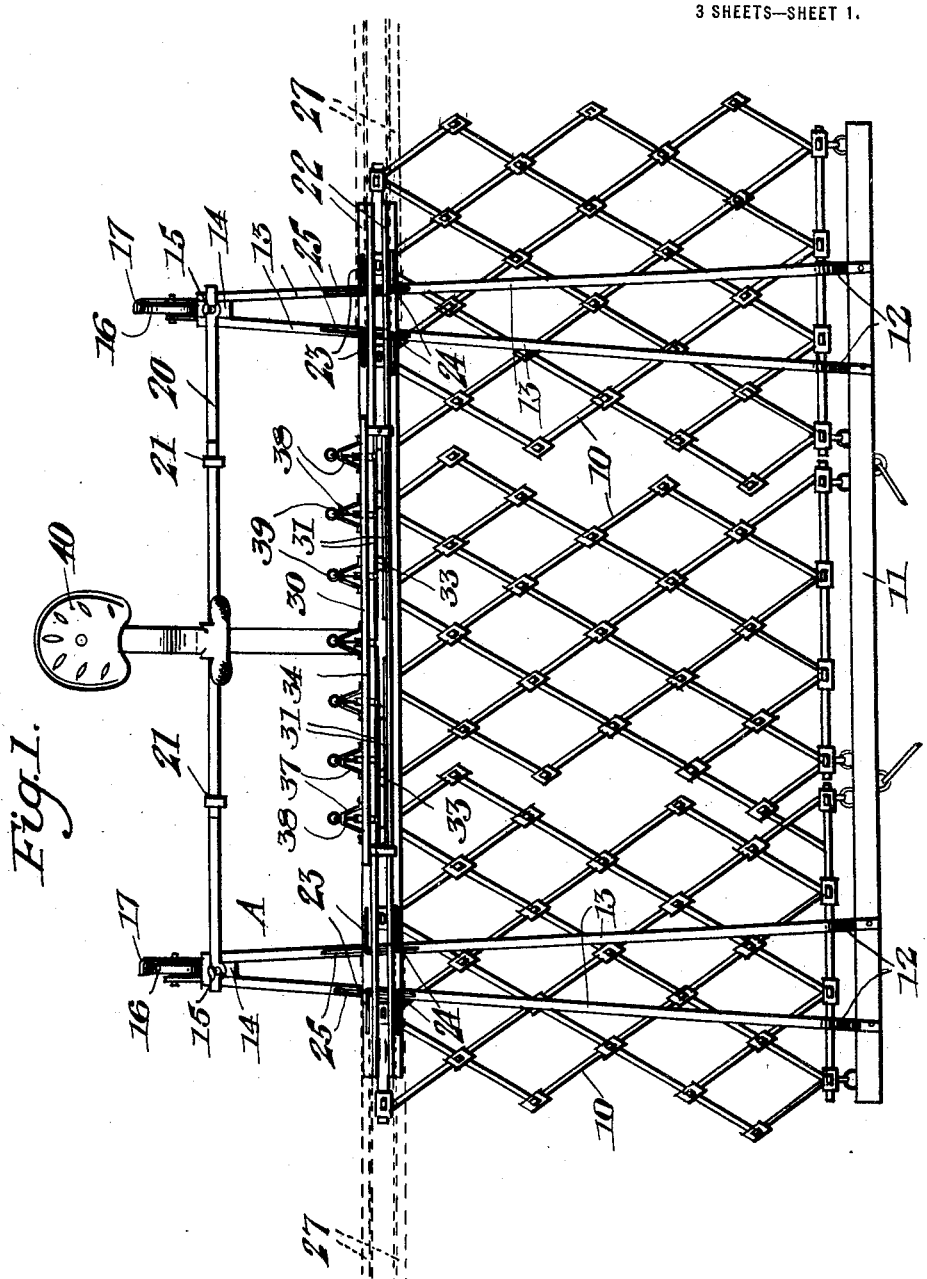
Figure 1 is a plan view of a harrow embodying my invention.
Figure 2:
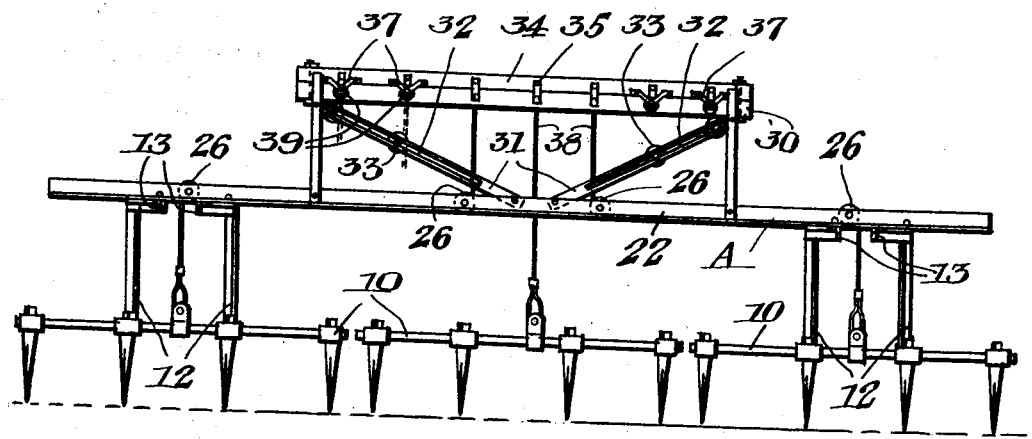
Fig. 2 is a rear view of the same with the seat and truck wheels removed for the sake of clarity.
Figure 4:
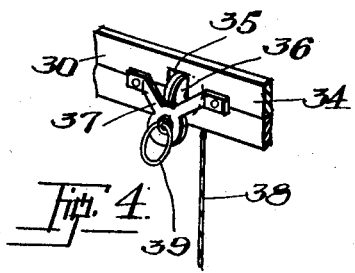
Fig. 4 is a perspective view of a portion of a frame showing a guide roller and guard member mounted thereon.
Figure 3:
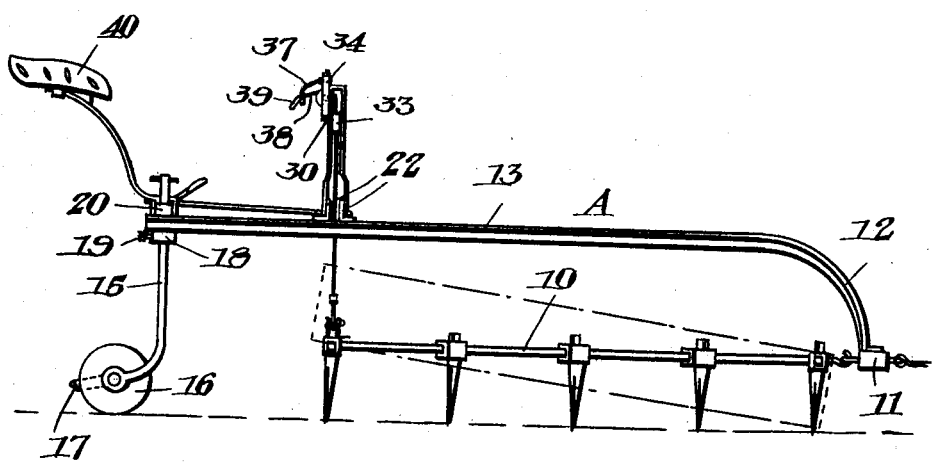
Fig. 3 is a side elevation of the improved harrow cleaner.

Referring to the drawings: A represents the improved drag harrow cleaner comprising a plurality of drag harrow sections 10 the forward ends of which are attached to a bar 11 to which horse or like traction may be attached. This bar 11 is connected to the curvilinear forward ends 12 of the angle bars 13 which are arranged in pairs and converge toward the rear of the machine, each pair of angle bars 13 being connected to a boxing 14 in which is journaled the vertical spindle 15 on the lower end of which the truck wheel 16 is journaled.

A cleaning element 17 is formed on the spindle 16 and is located adjacent to the periphery of the wheel 16 and the angle bars 13 are adjustable on the spindle 15 so that the height can thus be altered to suit the amount of lift which is to be given to the rear end of each harrow section 10.

The adjustable means which I provide on the spindle 15 consist of collars 18 which are retained in position by set screws 19. The upper ends of the spindles 15 pass through orifices in the adjustable transversely extending bar 20 which is formed in two sections secured together by collars 21 and this bar 20 can be adjusted to alter the distance apart of each bar of the angle bars.

Extending transversely across the angle bars are a pair of spaced bars 22 which are preferably of angle section and these bars are provided with slots 23 through which bolts 24 pass, the said bolts passing through slots 25 in the angle bars 13.

It will thus be seen that the transverse bars 22 can be adjusted on the angle bars 13 to suit the length of harrow sections 10 being used.

The bars 22 are provided with a plurality of rollers 26 pivotally mounted thereon and when more than three harrows have to be used extension bars 27 are provided arranged in pairs and rigidly secured to the bars 22, the said extension bars having slots 28 in their vertical flanges to adjustably support rollers 29 between the extension bars.

A frame 30 of rectangular formation is mounted on the bars 22 and strut members 31 are provided having slots 32 therein in which the rollers 33 are adjustably mounted, and the transverse member 34 of the frame 30 is provided with a plurality of orifices 35 in each of which a roller 36 is rotatably mounted.

On the rear face of the transverse member 34, a guard 37 is mounted and a flexible member 38 passes through the guard and over the pulley 36 around guide pulleys 26 and is attached to a harrow section 10.

It will be understood that each harrow section has a flexible member 38 passing over suitable guide pulleys and through a guard 37 and formed with a ring 39 on the end which is used as a hand grip.

A seat 40 is mounted on the truck frame and the driver has all the rings 39 adjacent to his hand so that he can pull whichever flexible member 38 he desires and a lifting force will be applied to the rear end of a corresponding harrow section which elevates the said section and thus allows any weeds, or foreign material collected thereon to drop on the ground, so cleaning the harrow teeth and after the harrow has been dropped to its normal position the said teeth will be able to properly function and harrow the ground.

Each harrow section may be elevated and lowered as often as it is necessary to effectively clean the harrow teeth.

The harrow may be made of the desired size with the necessary extension bars to provide for a sufficient number of harrows being simultaneously operated to suit the requirements of the farmer using this device.

As many changes could be made in the above construction and many widely different embodiments of my invention within the scope of the claims, constructed without departing from the spirit or scope thereof, it is intended that all matter contained in the accompanying specification and drawings shall be interpreted as illustrative and not in a limiting sense.

What I claim as my invention is:

1. A harrow cleaner consisting of a truck frame having pairs of angle bars converging toward each other, the front of the bars being designed to be secured to the draw bar of a harrow, an adjustable bar connecting the rear ends of the angle bars, wheels located at the rear end of the angle bars, a pair of spaced transverse bars adjustably mounted on the angle bars, a frame on the transverse bars, guide means on the frame, and flexible means extending over the guide means adapted to be connected to the harrow sections, as and for the purpose specified.

2. The harrow cleaner claimed in claim 1, in which guards are located adjacent to the guide members and through which guards the flexible members extend.

3. The harrow cleaner claimed in claim 1, in which extension bars are provided and connected to the transverse bars.

4. The harrow cleaner claimed in claim 1, in which the angle bars have longitudinal slots therein and the transverse spaced bars have longitudinal slots therein, and bolt means extending through the said slots.

In witness whereof I have hereunto set my hand.

GEORGE KENDEL.